FIG_3A

FIG_4

FIG_5

INVENTORS
MARVIN H. GROVE
BY LYLE R. VAN ARSDALE

ATTORNEYS

FIG_6

FIG_8

FIG_10

FIG_9

United States Patent Office 3,423,988
Patented Jan. 28, 1969

3,423,988
METER PROVER APPARATUS
Marvin H. Grove, Piedmont, Calif., and Lyle R. Van Arsdale, Houston, Tex., assignors to M & J Valve Company, Houston, Tex., a corporation of Delaware
Filed Aug. 1, 1966, Ser. No. 569,362
U.S. Cl. 73—3      11 Claims
Int. Cl. G01f 25/00

ABSTRACT OF THE DISCLOSURE

Meter proving apparatus of the type using a metering pipe which receives a flow propelled sphere or plug and which has a valve controlled flow connection between the ends of the metering pipe. Leak detecting means is incorporated with the apparatus so that if valve leakage occurs, such as would interfere with metering accuracy, it is immediately detected.

---

This invention relates generally to a method and apparatus for proving the accuracy of fluid flow meters.

In connection with pipeline systems for conveying various liquid petroleum products, it is important to provide accuracy in metering the flow. The more conventional flow metering devices, such as meters of the turbine and positive displacement types, are subject to serious inaccuracies. Of recent years, so-called meter provers have been employed which make accurate periodic checks of the flow for calibration of the flow meter. One unidirectional form of meter prover which has been developed is disclosed in Patent 2,774,561 and employs an extended loop of metering pipe of uniform internal diameter which is adapted to be connected between upstream and downstream parts of the main line. An interchange connects between the inlet and discharge ends of the metering pipe and is valve controlled to enable a sphere, plug or like barrier means to be launched from the interchange into the inlet end of the metering pipe and to be returned to the interchange after it reaches the discharge end. By means of an associated electrical system which is activated when the sphere passes through detecting points near the inlet and discharge ends, a flow meter reading is obtained for the time required for the travel of the sphere between the detecting points. This reading is then compared with the known volume of the metering pipe between the detecting points to provide accurate calibration data.

In the unidirectional type of meter proving apparatus just described, the sphere or plug is always caused to move in one direction. Another type of meter prover which is used is of the bidirectional type. The metering pipe in this instance has its end portions connected to the transmission line through a four-way diverter valve, whereby flow takes place through the metering line in alternate directions during a metering run.

While the basic principle of both the unidirectional and bidirectional meter proving apparatus is excellent and should produce accurate data for calibrating the turbine or positive displacement meter, in actual practice certain difficulties have been experienced which make for inaccuracies. In both types of apparatus, it is common practice to use two gate valves on the downstream side of each meter, and these valves are opened or closed to direct the flow to the downstream part of the main line, or to direct it through the meter prover loop. In addition, valve means is employed in conjunction with the meter prover loop to control a meter prover run. Thus, with unidirectional meter provers the so-called interchange empoys two gate valves which are opened and closed sequentially to deposit the sphere in a position ready to be released for a run. With the bidirectional type of meter proving apparatus, the valve means associated with the loop serves to reverse the flow to complete a run. This may be a diverter valve of the four-way type which is moved between two operating positions to effect flow reversal. In the event any of the valves referred to above are subject to leakage immediately before or during a cycle of operation of the meter prover, the data obtained is inaccurate for proper calibration. The magnitude of the inaccuracy is dependent upon the extent to which the valves may be leaking. Although it is possible to construct valves that are relatively free of leakage, it will be evident that any valve may under certain adverse conditions be subject to leakage, as for example, if it is not operated correctly, or if the sealing surfaces become excessively worn through long usage or because of the presence of abrasive materials.

In general, it is an object of the present invention to provide a meter prover method and apparatus which will overcome the difficulties pointed out above.

Another object of the invention is to provide a meter prover method and apparatus which will positively detect any significant valve leakage immediately before or during a meter prover run.

Another object of the invention is to provide a method and apparatus of the above character which can be used with both unidirectional and bidirectional types of meter provers.

Additional objects and features of the invention will appear from the following description in which the preferred embodiments have been set forth in detail in conjunction with the accompanying drawing.

Referring to the drawing.

Figures 1, 2:
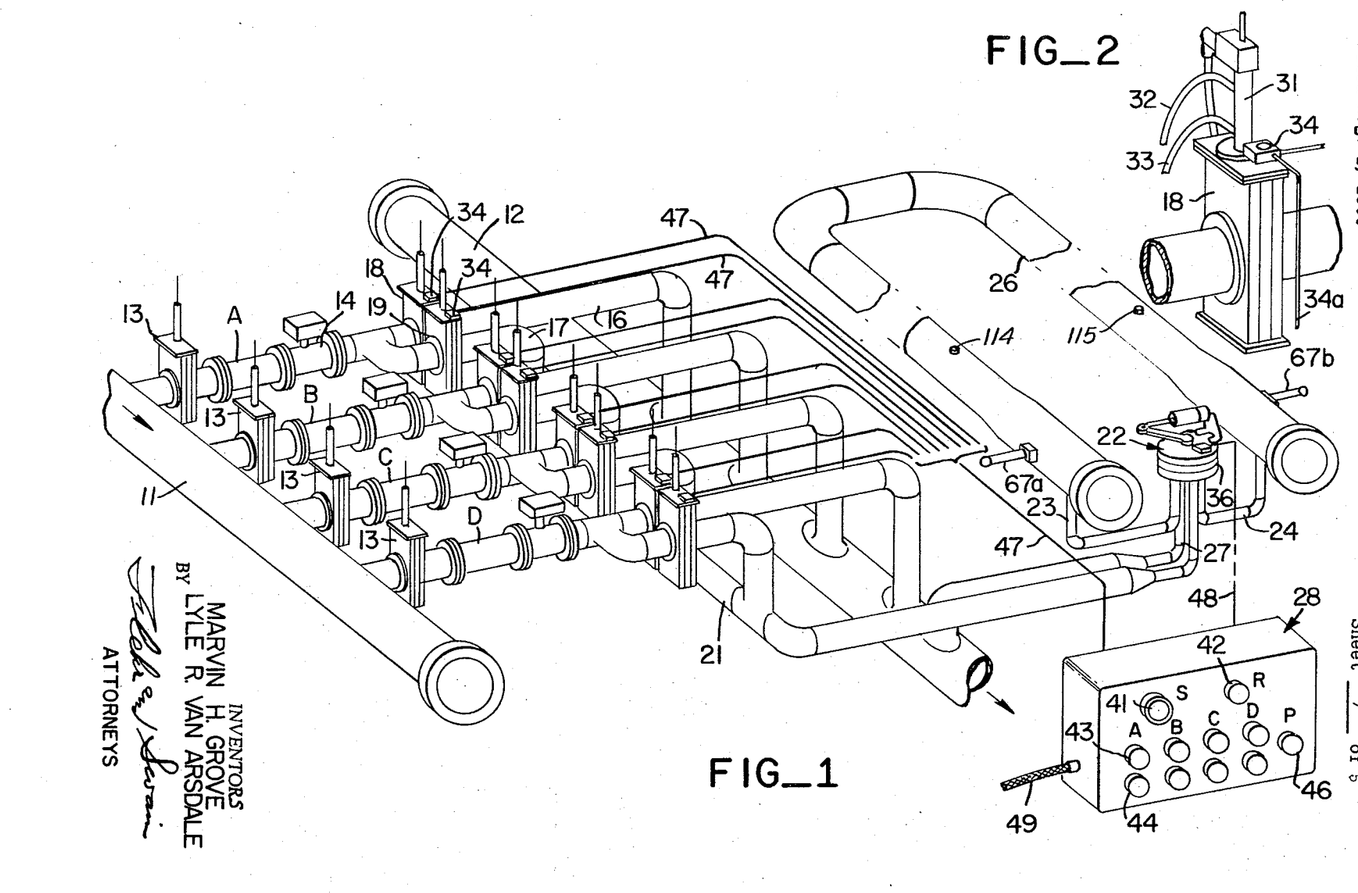
FIGURE 1 is a schematic view in perspective, illustrating meter prover apparatus of the bidirectional type.
FIGURE 2 is a perspective view showing one of the gate valves used with the apparatus of FIGURE 1.

The apparatus shown in FIGURE 1 incorporates several meter lines and serves to provide what can be referred to as a custody transfer system. It also incorporates a meter prover of the bidirectional type. Lines 11 and 12 represent upstream and downstream parts of the main pipeline. The metering lines A, B, C and D connect to the upstream line part 11 through the valves 13. Each metering line includes a flow meter 14 which may be any one of several types. In a typical instance it may be one of the turbine type provided with a visual register or recorder, and it may be electrically connected to a central control station where a suitable read-out means or recorder is provided.

The downstream side of each meter 14 connects with the two lines 16 and 17, through the valves 18 and 19. Each line 16 connects with the downstream line part 12, and each line 17 connects with the downstream line part 12, and each line 17 connects with a common line 21 which in turn connects to the four-way diverter valve 22 of the meter prover. The diverter valve 22 is connected by lines 23 and 24 to the end portions of the meter prover loop 26. Also line 27 serves to connect the diverter valve with the downstream main line part 12.

Each of the valves 18 and 19, and also the valve 22, is provided with leak detecting means. Electrical connections are made between the detecting means of each valve and a console 28 which is generally located at a remote control station.

All of the valves preferably are of the power operated type, controlled electrically, hydraulically, or pneumatically from a remote station. In a typical instance, each valve may be provided with a double acting hydraulic piston and cylinder device which is connected to a hydraulic system including a source of liquid under pressure and four-way control valve. The four-way valve is preferably controlled from the control station to effect opening and closing of the individual valves.

Referring to FIGURE 2, each gate valve 18, may have its operating rod connected to the double acting piston and cylinder device 31. The hoses or tubes 32 and 33 connect the ends of the cylinder with the hydraulic system. Leak detecting device 34, which is mounted upon the valve body, incorporates a small solenoid operated vent valve which is normally closed and which can be operated to momentarily vent the body space of the valve to atmospheric pressure. Pipe line 34a can be provided for conducting the vented fluid to a sump. Device 34 also includes a fluid pressure operated electrical switch which has a fluid connection with the body space of the valve. The contacts of the pressure operated switch connect with indicating means at the control station. Another leak detecting device 36 is mounted upon the body of the diverter valve 22 and is the same as device 34.

It will be evident that the arrangement and character of the switches and indicating devices incorporated in the console 28 may vary in different instances. As illustrated in FIGURE 1, the panel of the console includes a key operated switch 41 which is operated to energize or de-energize the entire electrical system. It also includes a switch operating button 42 which serves to release the sphere of the prover to start a run. It includes four sets of buttons 43 and 44 which are electrically associated with the meter lines A, B, C and D and the devices 34 for the various gate valves 18 and 19. It also includes a button 46 which is associated with the leak detecting means for the diverter valve 22. For convenience, each of the switch buttons may be transparent and used in conjunction with a pilot light behind the panel, thereby providing a light indication. The devices 34 of each of the valves 18 and 19 are shown having electrical cable connections 47 to the console 28, and likewise the console has a cable connection 48 with the device 36 of the diverter valve. Cable 49 represents connections with a suitable power supply.

Figures 3, 7:
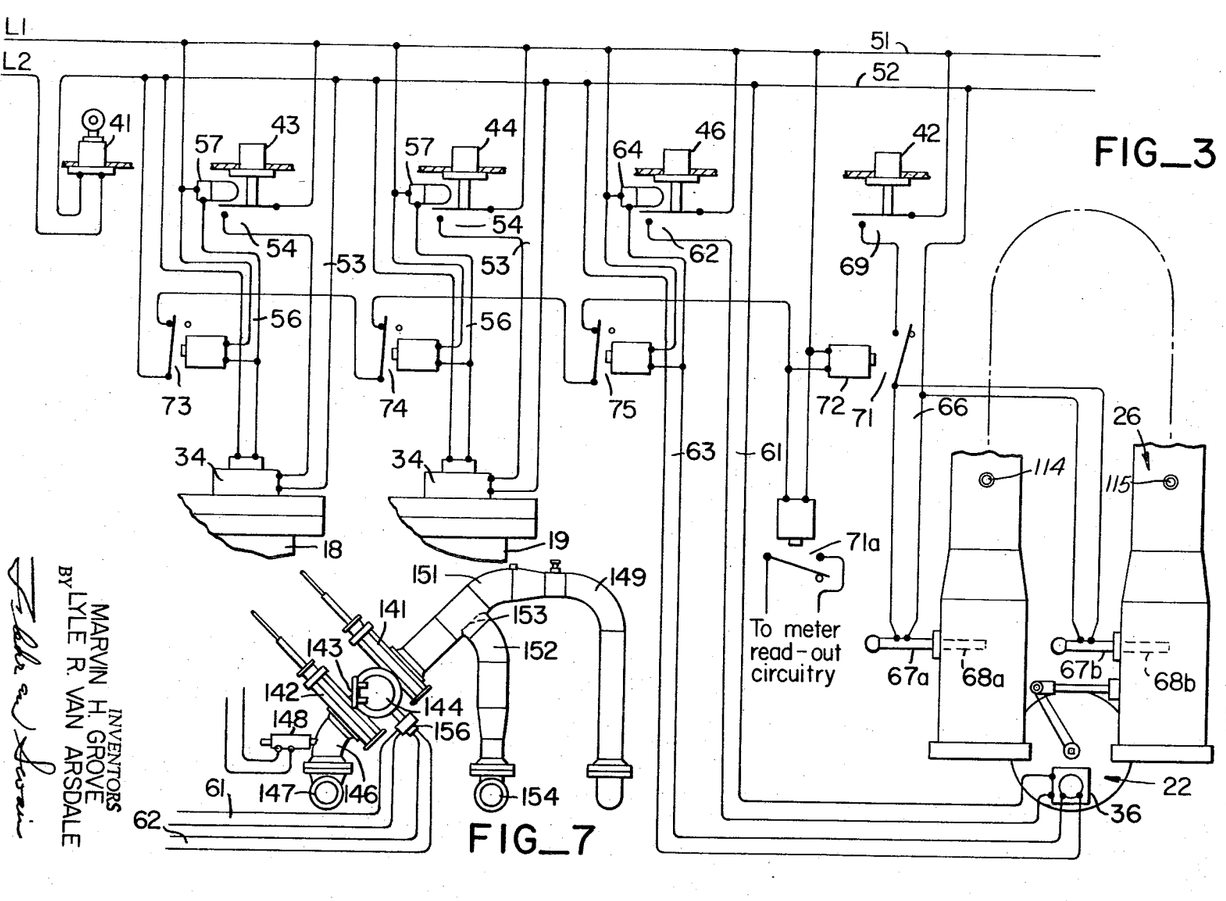
FIGURE 3 is a circuit diagram showing suitable electrical connections between a control station and leak detecting means located in conjunction with the various valves.
FIGURE 7 is a schematic view showing a unidirectional type of proving apparatus, with electrical connections indicating how this type of prover can be incorporated in the general system of FIGURE 3.

Referring to FIGURE 3, the terminals of the switch 41 are shown connected in series with the bus conductors 51 and 52 which connect with power supply lines L–1 and L–2. The circuit 53 connects to the terminals of the solenoid incorporated in device 34 for valve 18 of meter line A, and this circuit includes the contacts of switch 54 which are closed when the switch button 43 is depressed. It also includes connections to the power supply conductors 51 and 52. The circuit 56 connects to the terminals of the pressure switch incorporated in device 34 and includes the indicator lamp 57 and has connections with conductors 51 and 52. Thus when the contacts of the pressure switch (for valve 18 of line A) are closed due to pressure existing in the body space of valve 18, the signal light 57 is energized and provides a light indication upon the exterior side of the console panel by viewing the light through the switch button 43. For psychological purposes, it is desirable to use red light.

Valve 19 of line A is similarly provided with circuits like valve 18, including the circuit 53, the contacts 54, the circuit 56 and the lamp 57. It is to be understood that the buttons for lines B, C, and D have similar circuitry (not shown) that is connected to the devices 34 of corresponding valves 18 and 19.

The switch button 46 is associated with the circuit 61 which connects with the terminals of the solenoid for device 36, and also connects with a switch 62 corresponding to the switch 54. This circuit also has connections with the power supply conductors 51 and 52. It also employs a signal circuit 63 which connects with the terminals of the pressure switch incorporated in device 36. It includes the signal lamp 64 and is connected across the conductors 51 and 52.

An electrical circuit 66 (FIGURE 3) connects with the retractable solenoid operated devices 67a and 67b. These devices are provided in the ends of the prover loop. When energized the pins 68a and 68b of these devices are retracted to release a sphere. Thereafter they may be returned manually to their sphere engaging positions.

It is desirable to provide means which disables the apparatus in the event leakage occurs through any one of the valves 18, 19 or 22. The particular disabling means illustrated is electrical, and includes a normally open switch 71 having its contacts in series with the circuit 66 and electromagnetically operated to closed position. The terminals of the operating electromagnet 72 are connected in series with a circuit which also is serially connected with with the contacts of the normally closed electromagnetic switches 73, 74 and 75. The electromagnets of these switches are connected with the circuits 56 and 63, whereby when any one of these circuits is energized, the corresponding one of the electromagnetic switches 73, 74 and 75 will be energized to open its contacts. The circuit including these contacts is also connected across the power conductors 51 and 52. It will be evident that the contacts of mtgnetic switches 73, 74 and 75 must all be closed to effect operation of switch 71 to close its contacts, thereby permitting circuit 66 to be energized by pushing upon button 42, thus energizing devices 67a and 67b. In other words, the sphere cannot be released for a run if the contacts of switch 71 are not closed, and this in turn is dependent upon each one of the circuits 56 and 63 being de-energized.

Figure 4:
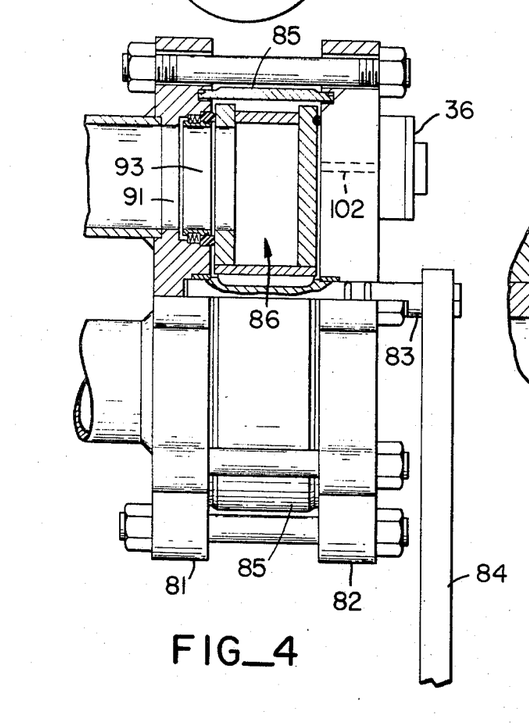
FIGURE 4 is a side elevational view showing a four-way diverter valve of the type illustrated in FIGURES 1 and 3, and partly in section.
Figure 6:
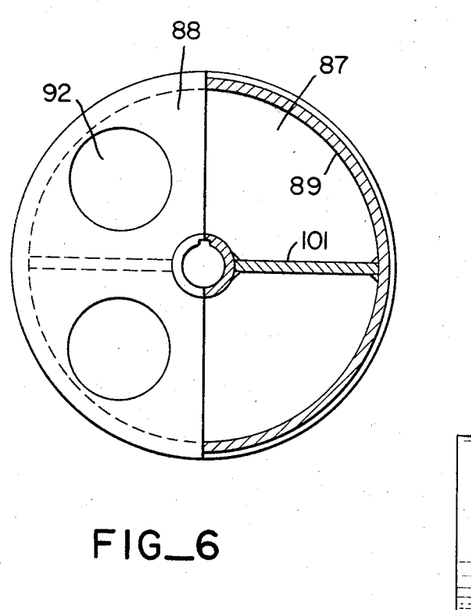
FIGURE 6 is an end view of the rotary valve member incorporated in FIGURE 4, one-half of the same being in section.

FIGURE 4 illustrates a suitable type of diverter valve of the type disclosed and claimed in application Ser. No. 541,269 filed Apr. 8, 1966. It consists of a body formed of the flat end members 81 and 82, together with the cylindrical intermediate body member 85, against which the end members 81 and 82 are clamped. A central operating shaft 83 is journalled in both members 81 and 82 and is provided with the operating lever 84. Within the body there is a rotatable valve member 86 formed as shown in FIGURE 6 and mounted on the shaft 83. It consists of flat circular end plates 87 and 88 which have their peripheral margins welded to the ends of the cylindrical member 89.

Figure 5:
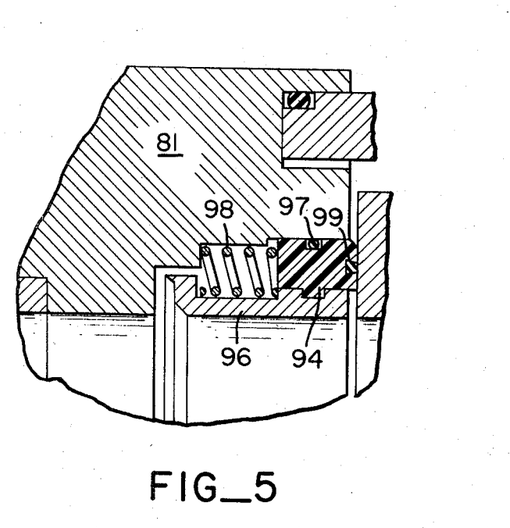
FIGURE 5 is an enlarged detail in section showing the sealing means incorporated in FIGURE 4.

The end member 81 of the body is provided with four circumferentially spaced openings 91 that are adapted to connect with the associated piping, and which are also adapted to register with four ports 92 in the end member 88 of the valve member 86. Four annular sealing assemblies 93 are carried by the end member 81 and serve to establish sealing contact with the surface of the member 88. This sealing assembly preferably of the type disclosed in copending application Ser. No. 453,403 filed May 5, 1965, and is shown in detail in FIGURE 5. It consists of a seal ring 94 made of suitable resilient material such as nylon which is carried by the relatively rigid carrier ring 96. The seal ring 94 is slidably fitted within the end member 81 of the body and is sealed with respect to the same by the resilient O-ring 97. A plurality of circumferentially spaced compression springs 98 serve to urge the seal ring 94 against the adjacent face of the valve member. Preferably the nylon seal ring is provided with an insert 99 of relatively softer resilient material such as synthetic rubber or a suitable elastomer, and this insert establishes good sealing contact with the adjacent metal valve working surface.

The valve member 86 is provided with an internal barrier 101 which extends between two pairs of the ports 92.

It will be evident that the diverter valve described above is installed in the manner illustrated in FIGURE 1 with its various openings 91 connected to piping in the manner illustrated. Also it will be evident that the directional flow through the loop 26 is reversed when the lever 84 is moved 90° between operating positions.

The device 36 is shown mounted upon the body end member 82. It is in fluid communication with the close space within the body by the indicated duct 102. Duct 102 is normally closed in the normal positioning of the solenoid operated valve. When the solenoid operated vent valve is electrically energized, duct 102 is connected to the atmosphere whereby the body space is reduced to atmospheric pressure. The pressure cell of the pressure operated switch incorporated in device 36 is in continuous communication with the body space through the duct 102. Assuming that duct 102 has been vented to the atmosphere by energizing the solenoid operated valve, if thereafter the pressure operated switch is actuated by pressure substantially greater than atmospheric, a leak is indicated because such pressure can be built up only by leakage of line fluid past one of the sealing assemblies 91. The pressure cells of the device 36, and also of the devices 34, are set for a relatively low pressure above atmospheric, as for example, 5 to 10 p.s.i.

Figure 8:
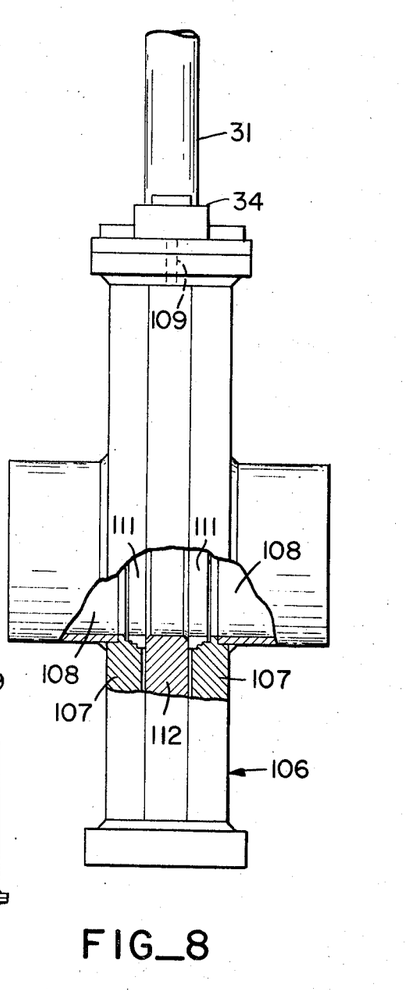
FIGURE 8 is a side elevational view partly in section showing a gate valve suitable for use with our invention.

FIGURE 8 illustrates a suitable gate valve of the through port type for the valves 18 and 19. It consists of a body 106 which is box-like or rectangular in cross-section. The end walls 107 have openings 108 for making connection with associated piping. The top of the valve serves to mount the hydraulic operator 31 which, as previously explained, serves to move the valve operating stem. A duct 109 serves to provide fluid communication between the body space and the device 34. This valve is likewise shown with sealing assemblies 101 carried by the body and making sealing engagement with the sides of the valve gate 112. Here again the sealing assembly may be constructed substantially like the assembly shown in FIGURE 5.

It will be apparent that when the valve of FIGURE 8 is closed, the seal relied upon is that on the upstream side. During movements of the valve between open and closed position, line fluid establishes line pressure within the body space surrounding the gate 112. However, when the solenoid operated valve incorporated in device 34 is energized to vent the duct 109 to the atmosphere, the pressure within the body is quickly reduced to atmospheric, and thereafter remains at atmospheric pressure unless leakage occurs past the upstream seal. If such leakage should occur, pressure builds up in the valve body, with the result that the pressure operated switch is actuated. Likewise, when the valve is opened the body may be vented to atmospheric pressure and thereafter will not build up unless the seals are leaking.

One manner in which the method is carried out and in which the apparatus operates can be briefly reviewed as follows. Normally, flow is occurring through some or all of the metering lines A, B, C, and D. In other words, the valves 13 are open, the valves 19 closed, and the valves 18 are open. Assuming that it is desired to check the accuracy of meter 14 in line A, the closed valve 19 in line A is first checked for leakage by pressing the button 44. When this button is depressed, the circuit 53 associated with the same is closed by the closing of switch 54, thus operating the solenoid valve of the associated device 34 to vent the body space of the associated gate valve. Thereafter, when the button 44 for line A is released, the contacts of the pressure switch will remain open unless pressure builds up within the body, in which event the contacts are closed. Closing of the contacts lights the lamp associated with button 44, with the result that the operator is immediately apprised of the fact that this particular valve is leaking. Valve 19 is now opened and valve 18 closed, whereby flow is directed through the meter prover loop in a direction depending upon the positioning of the diverter valve 22. Such flow is maintained until a stable fluid temperature is reached. During this time, valve 18 of line A can be checked for possible leakage in the same manner as previously described, namely by pressing button 43 and then noting any build-up of pressure as indicated by the associated lamp 57. Likewise, during this time button 46 can be operated to make certain that there is no leakage past the sealing assemblies of the four-way diverter valve 22. Operation of this button again connects the body space of valve 22 to atmosphere and thereafter establishes communication between the pressure cell of the pressure operated switch and the body space. The sphere within the meter prover loop takes a position depending upon the direction of flow as determined by the diverter valve 22. Before commencing a meter prover run, the sphere-retaining devices 67a and 67b are manually operated whereby the sphere is retained at one end of the loop until released by retraction by the pin 68a. Assuming now that a check of the closed valve 18, open valve 19 and diverter valve 22 has indicated that no leakage exists, the diverter valve 22 is operated to reverse the direction of flow through the loop whereby the sphere is moved against the adjacent detent pin which, for example, may be pin 68a. The operator now pushes the release button 42, which serves to energize both release devices 67a and 67b to retract the pins 68a and 68b whereby the sphere is released. As the sphere moves by the detector 114, electrical circuitry starts the read-out or register of the flow meter in operation whereby a meter reading is obtained for movement of the sphere between detectors 114 and 115. After the sphere has passed detector 115, it comes to rest at the corresponding end of the loop, and thereafter the pin 68a can be returned to sphere engaging position manually. The hydraulic operator for the diverter valve 22 is now energized whereby the flow is reversed. The operator again presses the button 42 to release the sphere, whereby the sphere passes in a reverse direction through the prover loop. Eventually it passes the detecting device 114 and lodges on the left hand end of the loop. A similar meter reading is obtained for the return passage of the sphere. With such readings, and with the volume of the loop being known, the meter can be accurately calibrated.

Preferably the apparatus is disabled in the event a leakage should occur either immediately before operating the sphere detent 67, or while a run is being made. Thus, if before operating the sphere detent 67, any one of the indicating circuits 56 or 61 is energized by closing the contacts of the pressure operated switches, the contacts of the corresponding magnet operated switches 73, 74 or 75 are opened, with the result that magnet 72 is de-energized and the contacts of switch 71 opened. Thus it will be impossible to start the metering run by energizing the detents 67a and 67b. A second safety arrangement can be provided in the event a leakage occurs during a run. Thus an additional circuit can be provided, operated by contacts associated with magnet 72, whereby the hydraulic power supply to the hydraulic operator of diverter valve 22 is disabled, thus preventing the shifting of this valve to its second position to cause a reverse direction of the sphere.

Figure 3A:
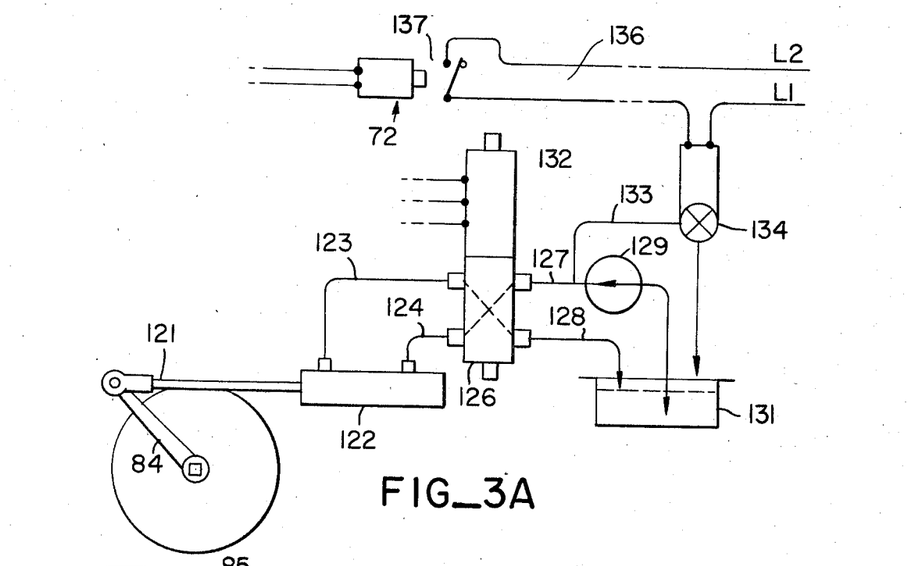
FIGURE 3A is a circuit diagram showing means that can be associated with FIGURE 3 for disabling the prover means for the diverter valve in the event of a leak.

Electrical means for automatically disabling operation of the diverter valve 22 is shown schematically in FIGURE 3A. The operating lever 84 of the valve 22 is shown attached to the operating rod 121 of the double acting piston and cylinder device 122. The hydraulic lines 123 and 124 leading from the ends of the cylinder connect to the four-way valve 126 which in turn is connected by lines 127 and 128 of a hydraulic pressure system. This system may include the motor driven hydraulic pump 129 and the liquid reservoir 131. Pump 129 has an intake line receiving liquid from reservoir 131, and has its discharge side connected to the four-way valve 126 through line 127. Line 128 returns liquid to the reservoir 131. Suitable means such as a two-way solenoid 132 serves to move the four-way valve 126 between its operating positions. The circuits connected to the solenoid 132 can be controlled automatically to afford the desired cyclic operation of the four-way valve. A bypass line 133 connects between the discharge side of pump 129 and the reservoir and it is controlled by the solenoid operated valve 134. The solenoid of this valve is connected in a circuit 136 which includes current supply lines L-1 and L-2 and the contacts of a switch 137. These contacts are indicated as being operated by the magnet 72 which corresponds with the magnet 72 of FIGURE 3. It will be evident that when the magnet 72 is operated to effect closure of contact 71 thus closing the circuit 66, contacts 137 are likewise closed whereby the solenoid of valve 134 is energized to prevent bypass back through the line 133. Under such conditions the pump will properly supply fluid through the four-way valve to the hydraulic operator 122. However, in the event a leakage does occur, circuit 136 is opened with the result that the solenoid of valve 134 is no longer energized, and therefore fluid freely bypasses through the line 33, thus preventing application of operating fluid pressure to the operator 122.

Another way to disable the apparatus in the event of a leak in any one of the valves is to provide means for disabling the read-out means of the flow meter. Thus the meter read-out or register may be electrically connected to the meter by circuitry that is open circuited or shorted out when a leak is detected, whereby it is impossible under such conditions to obtain the necessary meter data for calibration. For example, the magnet operated switch 71a may have its contacts included in the meter read-out circuitry to disable the same and prevent a meter reading when these contacts are open. The winding of switch 71a may be in shunt with the winding of switch 71.

The changes necessary to convert the apparatus of FIGURES 1 and 3 to a prover of the unidirectional type are shown in FIGURE 7. This figure shows the interchange portion of a unidirectional prover. The first and second gate valves 141 and 142, which are shown inclined to an angle of 45° to the horizontal, are interconnected by a T 143 which forms a sphere accommodating cavity. The T has a quick removable clamp-on cover 144 to facilitate the introduction or removal of a sphere. Pipe fitting 146 connects the lower side of valve 142 with a pipe 147, and is provided with the solenoid operated sphere detent 148. The inlet end of pipe 147 connects with the upstream part of the main line, and in addition, pipe 147 connects with the inlet end of the proving loops. The discharge end 149 of the prover loop connects with the upper side of the gate valve 141 through the conduit section 151. A downwardly extending pipe section 152 has its upper end in communication with conduit 151 through the grating 153, and its lower end connects with the pipe 154 which represents the main downstream pipe line.

Before commencing a proving run, valves 141 and 142 are opened successively to permit the sphere to move down against the detent 148. Some flow may now take place through the loop to attain an equilibrium temperature level. With both valves 141 and 142 closed, the detent 148 is retracted to permit the sphere to fall down into the inlet end of the proving loop, and thereafter the sphere moves past the detecting stations and eventually is received into the conduit section 151 to again come to rest upon the inlet side of the gate 141. As shown in FIGURE 7, a device 156, comparable to the devices 34 and 36, is connected by a pipe to the interior of the T 143, and the terminals of the solenoid and of the pressure operated switch are connected to circuits as indicated and corresponding to the circuits 61 and 63 of FIGURE 3. Thus closing of the circuit 61 for a short interval causes the solenoid valve to be temporarily opened with the result that the pressure in the T 143 is reduced to atmospheric. Thereafter, the pressure cell of the pressure operated switch of device 136 is in communication with the interior of the T 143, whereby if this pressure should increase due to leakage past the valve 141, then the signal circuit corresponding to circuit 63 of FIGURE 3 is operated.

It will be evident that when the apparatus of FIGURES 1 and 3 is modified by the substitution of the unidirectional prover of FIGURE 7 for the bidirectional prover shown in FIGURES 1 and 3, the operation is substantially the same as previously described. However, with the unidirectional prover of FIGURE 7, leakage is indicated by development of pressure in the T 143, which is sensed by the device 156.

Figure 9:
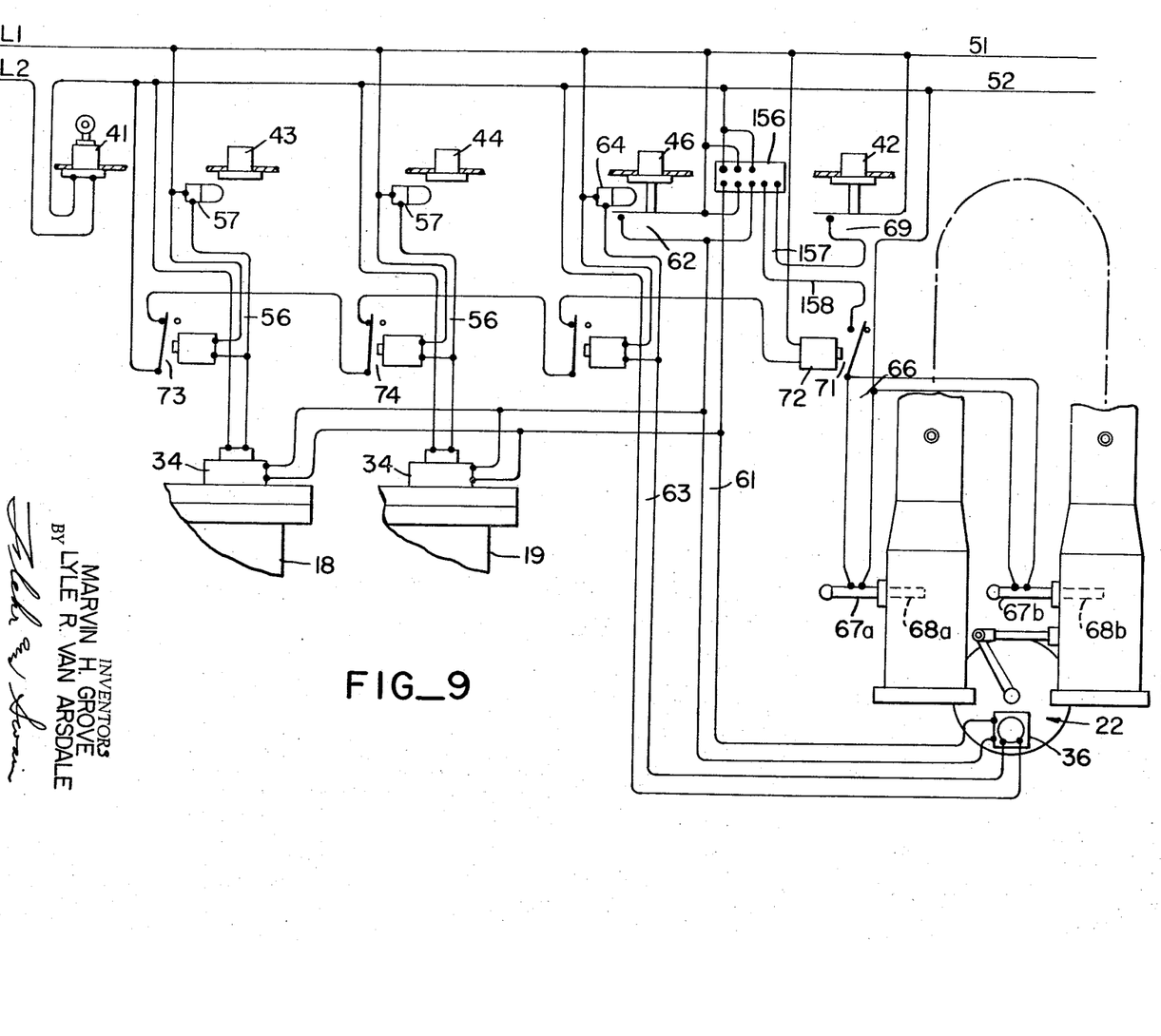
FIGURE 9 is a circuit diagram showing another embodiment of the invention utilizing time delay means.

In many instances it is desirable to vent all of the bodies of the several valves by operation of a single control button. Also it is desirable to provide time delay means which will ensure a proper predetermined time period for venting of the valve bodies and which, in addition, will prevent the starting of a run until expiration of the venting time and after there has been adequate time for operation and observation of the leak detecting means. FIGURE 9 shows such an embodiment. In general, this system is similar to that of FIGURE 3. However, the buttons 43 and 44 are merely light indicators, since switches 54 and circuits 53 are omitted. A timer 156 is connected in series with the circuit 61 whereby it is tripped to carry out a timing cycle when button 46 is pressed. One pair of contacts in the timer are immediately closed to form holding contacts in shunt with switch 62. These contacts are opened automatically after a predetermined time interval which is adequate to ensure proper venting of the valve bodies. A second set of contacts in the timer are closed after an interval of time following the first time interval, and these contacts are connected in series with circuit 66 whereby circuit 66 is disabled to start a run until a time interval has elapsed following the re-closing of the vent valves. This latter interval is sufficient for adequate functioning and observation of the leak detectors. In other words, it is adequate to permit a build-up of body pressure following the venting operation, if the valve is leaking. After completion of a meter proving run, the timer 156 is reset manually or automatically. Because the system of FIGURE 9 effects venting of all of the valve bodies by operation of a single button (i.e., button 46), the solenoid operated vent valves on the bodies of valves 18 and 19 are shown connected to the same circuit 61.

Figure 10:
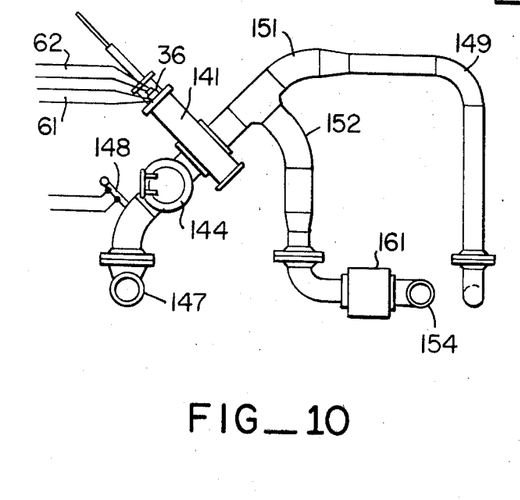
FIGURE 10 shows another embodiment of unidirectional prover apparatus.

The unidirectional equipment exemplified by FIGURE 7 can be simplified as shown in FIGURE 10. Here the second gate valve 142 is omitted. A leak detector device 34 is shown mounted on the gate 141, the same as in FIGURE 1. A check valve 161 is inserted in line 154 which leads from the interchange to the main downstream line 12. Check valve 161 is spring loaded to prevent back flow from the line 12 into the prover loop. With this arrangement the interchange can be drained of liquid to permit insertion or removal of a sphere through closure 144, because the check 161 serves to isolate the main downstream line 12 from the interchange.

Operation of the apparatus shown in FIGURE 10 is as follows. Valve 18 is opened and valve 19 closed. Valve 141 is now opened to permit the sphere to pass through the same, after which it is closed. After the sphere has been positioned on the detent, valve 141 is closed, valve 19 is opened and valve 18 closed to condition the system for starting a run. Before and during the run the valves can be checked for leakage as previously described.

In all of the foregoing embodiments it is assumed that the gate valves are of the through port type. It should be understood, however, that the so-called short gate valves can be used. However, in such event a leak indication must be obtained only when the valve is closed, because when the valve is open the body is at line pressure and cannot be vented down to atmospheric pressure. With the bidirectional embodiments of FIGURES 1, 3 and 9, valves 18 and 19 may be of the short gate type with omission of the relays 71–75 and the associated disabling circuitry. With the unidirectional apparatus of FIGURE 7, the valves 141 and 142 can be of the short gate type because they are closed during a run. Also in FIGURE 10 the valve 141 may have a short gate.

It will be evident from the foregoing that I have provided apparatus which will overcome the stated defects with respect to prior unidirectional and bidirectional meter prover equipment. Before a run is made, the operator is apprised of whether or not leakage is occurring in any one of the valves which must remain sealed if the run is to provide accurate calibration information. The signals or indications which apprise the operator of a leaky valve are coordinated at one control station and coordinated on a signal panel whereby when the run is commenced the operator can be certain that it will be accurate. A skilled operator will not attempt to make a run if the console indicates that any one of the essential valves is leaking. However, to make the operation more fool-proof, the apparatus may be constructed as disclosed to disable an essential part of the prover which must be operated to commence the run, in the event valve leakage occurs. Also, a predetermined timing can be interposed on the system to ensure proper venting of the valve bodies to ensure a proper interval after venting and before starting a run.

We claim:

1. In metering apparatus comprising at least one meter line adapted to be connected to the upstream part of a main liquid flow line, a flow meter interposed in said line, first and second valves connected to the downstream side of the metering means, separate first and second lines connected to the downstream side of said first and second valves, said first line being adapted to connect with the downstream part of the main line, meter proving means including a metering loop adapted to receive a sphere or plug, said meter proving means including valve means for controlling a meter proving cycle and adapted to be connected to said second line, means for temporarily venting the body spaces of the first and second valves to atmosphere, separate means for sensing a build-up of pressure in the body spaces of the first and second valves, thereby detecting leakage when the valves are closed, means for detecting leakage of the valve means associated with the meter proving means, means for initiating the start of a meter proving run, and means for providing separate indications with respect to build-up of body pressure in either one of the first and second valves and with respect to leakage of the valve means associated with the meter proving means, whereby an operator is apprised of leakage of either the first or second valve or said valve means before commencing a meter proving run.

2. Apparatus as in claim 1 in which the meter prover means is of the bidirectional type and in which the valve means consists of a four-way diverter valve adapted to be operated to control the direction of flow of liquid through the prover loop, said means for detecting leakage of the valve means comprising means for momentarily venting the body space of said four-way valve to atmosphere and means for sensing a build-up of pressure in the body space after operation of said venting means.

3. Apparatus as in claim 1 in which the meter proving means is of the unidirectional type, comprising a prover loop having an interchange connected between its inlet and discharge end portions, the interchange including a valve adapted to be closed to interrupt flow through the interchange.

4. Apparatus as in claim 1 in which the meter proving means is of the unidirectional type, comprising a prover loop having an interchange between its inlet and discharge portions, a valve interposed in the interchange, means for indicating leakage of said valve when closed, and a check valve interposed between the downstream portion of the main line and the outlet end of the prover loop, said check valve serving to prevent back flow from the downstream portion of the main line to the interchange.

5. Apparatus as in claim 1 together with a retractable pin mounted in the inlet portion of the meter prover loop, said pin when retracted serving to permit a sphere or plug to pass the same and enter the meter prover loop, means for actuating said detent, and means for disabling said actuating means in the event of a build-up of pressure in the body spaces of either the first or second valve means, or in the event of leakage of the valve means associated with the meter prover.

6. Apparatus as in claim 1 together with timing means for effecting operation of said venting means for a predetermined time interval and for disabling said means for initiating a meter proving run until after a predetermined time interval following said first mentioned interval.

7. Apparatus as in claim 2 together with power means for operating said four-way valve and means for disabling said power means in the event of build-up of pressure in either the first or second valves or build-up of pressure in the body space of the four-way valve.

8. In liquid flow metering apparatus, a metering pipe having an inlet end adapted to be connected to a main liquid flow line and also having a discharge end, the metering pipe being adapted to receive a flow propelled sphere or plug, piping forming an interchange connection between the inlet and outlet ends of the metering pipe and serving to transfer a sphere from the discharge to the inlet end of the metering pipe, valve means interposed in said piping and adapted to pass a sphere when open, sphere detent means in the piping between the valve means and the inlet end of the metering pipe and means for detecting leakage of said valve means when closed.

9. Apparatus as in claim 8 together with additional valve means for controlling flow of liquid from the main line through said metering pipe and means for detecting leakage of said additional valve means.

10. In liquid flow metering apparatus, a metering pipe having an inlet end adapted to be connected to a main liquid flow line and also having a discharge end, the metering pipe being adapted to receive a flow propelled sphere or plug, piping forming an interchange connection between the inlet and outlet ends of the metering pipe and serving to transfer a sphere from the discharge to the inlet end of the metering pipe, first and second valves interposed in said interchange piping, connecting means between the valves forming a closed cavity to accommodate a sphere or plug, retractable sphere detent means in said piping and located between the second valve and the inlet end of the metering pipe, means for venting the cavity of the connecting means when the first and second valves are closed, and means for indicating a build-up of pressure in said cavity after such venting.

11. Apparatus as in claim 10 together with valve means for controlling flow of liquid from the main line through the metering pipe and additional means for detecting leakage of said valve means.

References Cited

UNITED STATES PATENTS

| | | | |
|---|---|---|---|
| 1,959,863 | 5/1934 | Griss | 73—40 XR |
| 3,120,118 | 2/1964 | Boyle | 73—3 |
| 3,233,616 | 2/1966 | Chieffo | 73—40 XR |
| 3,254,523 | 6/1966 | Fisher et al. | 73—3 |

LOUIS R. PRINCE, *Primary Examiner.*

J. NOLTON, *Assistant Examiner.*

U.S. Cl. X.R.

73—40.5